(12) United States Patent
Smart

(10) Patent No.: US 9,818,193 B2
(45) Date of Patent: Nov. 14, 2017

(54) SPATIAL RESOLUTION ENHANCEMENT IN HYPERSPECTRAL IMAGING

(71) Applicant: SCANADU INCORPORATED, Moffett Field, CA (US)

(72) Inventor: Anthony Smart, Costa Mesa, CA (US)

(73) Assignee: Scanadu, Inc., Sunnyvale, CA (US)

( * ) Notice: Subject to any disclaimer, the term of this patent is extended or adjusted under 35 U.S.C. 154(b) by 45 days.

(21) Appl. No.: 14/374,515

(22) PCT Filed: Jan. 30, 2013

(86) PCT No.: PCT/US2013/023711
§ 371 (c)(1),
(2) Date: Jul. 24, 2014

(87) PCT Pub. No.: WO2013/116253
PCT Pub. Date: Aug. 8, 2013

(65) Prior Publication Data
US 2015/0015692 A1    Jan. 15, 2015

Related U.S. Application Data

(60) Provisional application No. 61/592,187, filed on Jan. 30, 2012.

(51) Int. Cl.
*G06T 7/00*      (2017.01)
*G01J 3/51*      (2006.01)
(Continued)

(52) U.S. Cl.
CPC ............ *G06T 7/003* (2013.01); *G01J 3/2823* (2013.01); *G01J 3/36* (2013.01); *G01J 3/51* (2013.01);
(Continued)

(58) Field of Classification Search
CPC ....................................................... G06T 7/003
(Continued)

(56) References Cited

U.S. PATENT DOCUMENTS 6,483,890 B1 * 11/2002 Malamud ............ A61B 6/4028
                                                          348/E3.031
7,092,101 B2 *  8/2006 Brady ...................... G01J 3/02
                                                          356/419
(Continued)

OTHER PUBLICATIONS

Copenheaver, Blaine R; PCT Search Report, App. No. PCT/US2013/023711; dated Apr. 5, 2013; 2 pages.
(Continued)

*Primary Examiner* — Dave Czekaj
*Assistant Examiner* — Shanika Brumfield
(74) *Attorney, Agent, or Firm* — Alford Law Group, Inc.; Tobi C. Clinton

(57) ABSTRACT

In a hyperspectral imaging system and method, a pixilated imaging sensor array receives light reflected from, transmitted through, or scattered by a target scene. Images of the target scene are acquired at a number of times and these images are processed to generate hyperspectral data for each pixel of the imaging sensor array based on data for the pixel included in each of the acquired images. This processing can include spatially aligning two or more of the images that were spatially shifted with respect to each other when acquired based on at least one common image feature in the images.

20 Claims, 6 Drawing Sheets

(51) Int. Cl.
    *G01J 3/28*         (2006.01)
    *G01J 3/36*         (2006.01)
    *H04N 5/232*      (2006.01)
    *G06T 7/33*        (2017.01)

(52) U.S. Cl.
    CPC ......... *G06T 7/337* (2017.01); *H04N 5/23229* (2013.01); *G06T 2207/10152* (2013.01); *G06T 2207/30088* (2013.01)

(58) Field of Classification Search
    USPC .......................................................... 348/77
    See application file for complete search history.

(56) References Cited

U.S. PATENT DOCUMENTS

| | | | | |
|---|---|---|---|---|
| 7,199,348 | B2 * | 4/2007 | Olsen ................... | G02B 3/0062 |
| | | | | 348/297 |
| 7,420,679 | B2 * | 9/2008 | Treado ................. | G01N 21/255 |
| | | | | 356/419 |
| 2003/0123056 | A1 * | 7/2003 | Barnes ................. | A61B 5/0059 |
| | | | | 356/300 |
| 2010/0259533 | A1 * | 10/2010 | Yamashita ........... | G09G 3/3233 |
| | | | | 345/213 |
| 2010/0259553 | A9 | 10/2010 | Van Belle | |

OTHER PUBLICATIONS

Copenheaver, Blaine R; PCT Written Opinion, App. No. PCT/US2013/023711; dated Apr. 5, 2013; 8 pages.

\* cited by examiner

Background

Bayer Mask Primitive for
Recursive Sensor Coverage

Background

| 9 | 16 | 2 | 7 | 14 | 11 | 5 | 4 |
|---|----|---|---|----|----|---|---|
| 6 | 3  | 13| 12| 1  | 8  | 10| 15|
| 15| 10 | 8 | 1 | 12 | 13 | 3 | 6 |
| 4 | 5  | 11| 14| 7  | 2  | 16| 9 |
| 14| 11 | 5 | 4 | 9  | 16 | 2 | 7 |
| 1 | 8  | 10| 15| 6  | 3  | 13| 12|
| 12| 13 | 3 | 6 | 15 | 10 | 8 | 1 |
| 7 | 2  | 16| 9 | 4  | 5  | 11| 14|

Fig. 4B

| 14| 11 | 5 | 4 |
|---|----|---|---|
| 1 | 8  | 10| 15|
| 12| 13 | 3 | 6 |
| 7 | 2  | 16| 9 |

Fig. 4A

SPATIAL RESOLUTION ENHANCEMENT IN HYPERSPECTRAL IMAGING

CROSS REFERENCE TO RELATED APPLICATION

This patent application claims the benefit of international patent application number PCT/US13/23711, titled SPATIAL RESOLUTION ENHANCEMENT IN HYPERSPECTRAL IMAGING, filed on Jan. 30, 2013. International patent application number PCT/US13/23711 claims the benefit of U.S. Provisional Patent Application No. 61/592,187, filed Jan. 30, 2012, which is incorporated herein by reference.

BACKGROUND OF THE INVENTION

Field of the Invention

This invention relates to the fields of medical diagnostics, telemedicine, mobile health, wireless health, and any application of hyperspectral imaging based upon a mask of individual pixel filters.

Description of Related Art

Hyperspectral imaging is an imaging modality that gathers continuous information across a vast portion of the electromagnetic spectrum, as opposed to traditional imaging modalities (e.g., a conventional digital otoscope (such as the digital otoscope shown and described in U.S. 2008/0051637)), which generate three bands (red, green, blue (RGB)) per image. Accordingly, hyperspectral cameras and sensors and associated image processing systems have the ability to determine unique hyperspectral fingerprints, or "signatures", known as "spectral signatures," where each extra-visible wavelength is assigned, and may be displayed as a visible 'false' color. For example, in agricultural and geologic applications, these signatures may be specific to plant species or oil materials, respectively. For medical applications, the majority of hyperspectral imaging has been used to assess superficial skin perfusion via differentiation between oxyhemoglobin and deoxyhemoglobin. This application has been implemented in numerous clinical settings, such as tumor identification and wound healing processes.

While conventional hyperspectral imagers are expensive and bulky, recent developments are leading to smaller hyperspectral imaging systems, such as the system described in U.S. patent application Ser. No. 11/642,867. One example of an available hyperspectral camera is the "Spectral Camera HS", manufactured by Spectral Imaging, Ltd in Oulu, Finland. This camera is configured to capture hyperspectral images in the 380-800 nm and 400-1000 nm spectral ranges. Based upon the availability of such miniaturized hyperspectral image sensors, they may be used in connection with devices or applications where conventionally monochrome or RGB image sensors are being used.

As is known, a hyperspectral cube (a "hyper-cube") is a four-dimensional datacube (including free parameter and intensity), which illustrates or depicts the electromagnetic spectrum of a surface across a very broad visible and extra-visible spectral range. Such a hyper-cube is a three-dimensional hyperspectral image data set, which illustrates the electromagnetic spectral content of a two-dimensional image spectral range. The cube has axes of spatial dimension (X), spatial dimension (Y), and wavelength, and it represents a complete possible spectral reflectance analysis of a surface. The cube represents a stacked set of two-dimensional monochrome frames, scenes or images, with each frame, scene or image corresponding to the light intensity at a given spectral band. Since a hyperspectral image contains a full spectral profile of each pixel, the image may be used in determining or obtaining useful information and data.

SUMMARY OF THE INVENTION

As is well known in the art, one implementation of hyperspectral imaging substantially enhances the information that may be derived from an image by distributing a pattern of many narrow-bandpass filters over the individual pixels of an array sensor. Hyperspectral imaging provides various improvements over other imaging techniques, including: (1) enhanced spatial and spectral resolution by image dither akin to the saccadic behavior of the human eye, (2) improved signal-to-noise ratio by using more than one spectral distribution of illuminant, (3) optimized spatial distribution of individual pixel filters according to specifically designed criteria, and (4) exploitation of inelastic scatter by using one or more narrow-band illuminants. In all cases, the processing of several sequential images can partially restore the loss of spatial resolution implicit in using detector array overlaid by a fixed-mask of a large number of individual narrow-bandpass hyperspectral filters. The fourth process, i.e., (4) above, also enhances the sensitivity to individual inelastic scattering properties of the observed material or scene by using a narrow-band illuminant that is transmitted by none or only one of the hyperspectral bands. Any changes in scattered wavelength by, for example, induced fluorescence or Raman scattering, then appear with improved contrast against a dark field, potentially identifying certain biological features and some physical and/or chemical properties of structures within the field of view.

For a conventional imaging device with pixilated array of CMOS, CCD, or Foveon x3® type detector elements (hereinafter "Foveon model"), each pixel detector element ideally has the same spectral sensitivity, reducing the post processing necessary to compensate for nonuniformity of sensitivity over the image recovered from the serial data stream typically available from such an array. Foevon model detectors are available from Foveon, Inc. of San Jose, Calif., USA 95134 (see, e.g., U.S. Pat. No. 8,351,696). "Foveon x3" is a registered trademark in the U.S. Pat. Nos. 2,694,153 and 2,696,784 of Foveon, Inc. of San Jose, Calif., USA 95134.

In the first two cases, the CMOS and CCD sensing elements yield a single signal intensity output from each pixel. In the case of the Foveon model, which is a 3 dimensional pixel array, the output of each pixel consists of three outputs for the colors red, green and blue, each of which is the average over a spectrally sensitive range typically analogous and roughly equivalent to the response of the human eye. The widely available CMOS and CCD devices often have a spectral filter mask array, such as the standard Bayer mask with a rectangular or square grid of red, green and blue filters, as shown in FIGS. 1A and 1B and further discussed below, with one filter type per sensing pixel. Processing the image permits the derivation of color information in the scene, by knowing which element of the data stream is derived from which color in a way that is analogous to the simplest aspect of color vision in certain living organisms. The Bayer mask may also use CMY or GMYG rather than RGB fixed color filters, and it is this potential for diversity that led to the present invention extended to us a wide range of narrow spectral filters. In one implementation of a device for multispectral and especially hyperspectral imaging, each pixel is preceded by its own relatively narrow-band filter. While this dramatically enhances spectral resolution it carries a cost in spatial resolution, which may be wholly or partially recovered by the presently-invented system and methods described below.

The detected signal P(x,y) from each individual pixel at coordinate (x,y) in a pixel array is given by the sum over all significant wavelengths (λ) of elementary products as: $P(x,y)=\int I(x,y,\lambda) \times R(x,y,\lambda) \times M(x,y,\lambda) \times S(x,y,\lambda) \, d\lambda$, where I(x,y,λ) is the illumination intensity, R(x,y,λ) is the scattering coefficient of the material from which that part of the imaged scene is derived, M(x,y,λ) is the transmission of the filter covering that particular pixel, and S(x,y,λ) is the sensitivity of that pixel, all at the same specific value of the wavelength (λ) averaged over the interval (δλ). The total available signal from that pixel is derived by summation over all applicable values of the wavelength (λ). For well-designed optics, the properties R(x,y,λ) observed by each pixel correspond uniformly to the average over that area in the imaged scene.

For ideal monochromatic imaging, I(x,y,λ), M(x,y,λ) and S(x,y,λ) are uniformly independent of position in the image. The local values of R(x,y,λ) integrated over the spectral band described by the distribution of wavelength (λ) is immediately available from the detected signal. To obtain the spectral resolution implicit in color vision two approaches are possible. In human vision, pixel sensitivity S(x,y,λ) varies in a complex pattern associated with the spatial distribution of cones in the retina—we are not here concerned with the behavior of the rods. Cones typically have three different spectral sensitivities, predominantly red, predominantly green, and predominantly blue comprising overlapping spectral sensitivities of different types of rhodopsin. (FIG. 2 illustrates such an exemplary distribution). This has not been exploited in solid state sensor devices in the same way, although the Foveon model may be considered similar but improved by the lack of a need to sacrifice resolution—because each pixel is sensitive to three separate wavelength bands (e.g., red, green and blue) with the equivalent monochromatic resolution being retained at the expense of the need for three times the data transmission rate. It has not been extended to implement further spectral resolution.

With respect to polychromatic resolution, to derive color sensitivity using monochromatic {I(x,y,λ)=I(λ)} sensors, where S(x,y,λ) is also constant {S(x,y,λ)=S(λ)} with x, y and λ, before each sensor is interposed a color filter with one of several different spectral transmissions. Sensors of this type are observed in the eyes of pigeons as droplets of fluid, which have typically four discrete filter transmission values M(λ). Also, in the eyes of pigeons, there is some imposed sensitivity to polarization. In digitally implemented color photography, the typical mask uses the Bayer distribution, which is a repeating grid of four rectangular (or more usually square) transmission filters based on the matrix [{x=0, y=0, =Red}; {x=1,y=1, =Blue}; and {x=0,y=1, & x=1, y=0, =Green}]. FIGS. 1A and 1B show a Bayer mask matrix R(x,y), and FIG. 2 illustrates typical pass bands for the three filters R(λ), with one matrix element per pixel. Color information is extracted as an RGB stream, and subsequently processed to give the illusion of a response similar to that of the human eye, but at a resolution slightly degraded by the ensemble averaging of local pixels for a constant transmission rate, although that can be partially restored by commonly used algorithms, as is well known in the art.

With respect to the rejection of scanning, for conventional hyperspectral imaging using a dispersive grating and a swept line detector, the spectral resolution is typically that of a grating spectrograph, which, although its finesse may be as high as 200 or more, is physically relatively large compared with a single 2-dimensional imaging array. Because of the large number of different filters in a fixed-array hyperspectral imaging device, any suitable spatial distribution analogous to, but different from, the Bayer mask or its equivalent, results in a much more sparse sensor array for any specific wavelength, compromising the equivalent Fellgett advantage, by reducing the associated spatial resolution. This is a consequence of using an imaging device rather than the linear scanning device, which is also popular, but is of less interest for four reasons: (1) it typically requires moving parts, (2) the array is still sparse (but differently so depending upon the grating resolution and the number of individual bandpass filters implemented) and now also has the disadvantage of being 'striped', (3) the reduced dwell time reduces SNR (loss of Fellgett advantage), and (4) the time to sweep a line sensor across an image is typically substantially longer than that to acquire a few successive 'dithered' image frames.

Hyperspectral imaging extends spectral resolution by spreading across the sensor array a pattern of a large number of narrow-band filters throughout and possibly beyond the conventional visible spectrum (typically 400 to 700 nm), within the sensitivity of the detector material (typically <350 nm to >1050 nm for the most conventional silicon, or even beyond for special detector materials). The peak transmission wavelength and bandwidth of each filter M(x,y,λ) may be freely chosen to enhance specific functional modalities, but the convention has been to cover the required bandwidth with a uniform array of equally wide filters each having only a small overlap with its spectrally adjacent filters. The spatial distribution pattern of filters is chosen to optimize the tradeoff between the number of filters distributed over the spectrum and the associated loss of spatial resolution (see below). Typically amplitude sensitivity for each pixel sensor is either sufficiently uniform over the sampled bit-depth or compensated by a look-up table during image restoration.

Hierarchy of Types (Table 1) shows qualitative relative performance for a single image at a constant data transmission bandwidth with all other things being equal.

TABLE 1

Spectral Resolution Methods

| Example | I(x, y, λ) | R(x, y, λ) | M(x, y, λ) | S(x, y, λ) | Spatial Resolution |
|---|---|---|---|---|---|
| Monochromatic | Uniform | Sensed; mono | Uniform | Uniform | Native |
| Human Eye | Uniform | Sensed; color | Uniform | 3 values | Degraded |
| Pigeon Eye | Uniform | Sensed; color | 4 values | Uniform | Degraded |
| Digital Camera | Uniform | Sensed; color | Bayer; 3 values | Uniform | Degraded |
| Hyperspectral | Uniform | Sensed; spectrum | Many values | Uniform | Seriously impaired |

In one preferred and non-limiting embodiment, the present invention is directed to a method of using several successive images each of the same data transmission bandwidth implicit above, while changing one or more of two variables between successive frames, the spectral dependence of the illuminant and/or the spatial overlay of a number of displaced examples of the imaged scene.

It is conventional to use ambient lighting for observation of large scenes such as Earth observation from Space, but for proximate visualization for such as medical imaging, the choice of illuminant is usually based upon the need to highlight such features as may be specifically the subject of the investigation. The most conventional illuminant is nominally 'white' light, whose color balance is corrected in a visual image or enhanced or distorted for 'false-color' imaging to enhance specific features of immediate interest, a technique of great power in conventional monochrome, color and hyperspectral imaging and elsewhere, as is well known in the art. For hyperspectral imaging implemented as a fixed spectral mask overlying an array of pixels, each of which has its own narrow band filter, the ideal illumination should be typically spatially and spectrally uniform over the entire scene. This holds true for elastic scattering, where the illuminating and scattered wavelengths are the same, but for inelastic scattering, such as fluorescence, an intrinsic or imposed property of many biological materials, the illumination may be outside the sensitive range into which it is shifted by a non-linear scattering process from a specific chemical. This applies equally to Raman scattering.

Many properties of structures of interest to the medical practitioner depend upon spectral reflectance, or more properly scattering, from such as damaged skin, changes in chemistry, presence of unusual and/or absence of expected chemicals, structures, and pathology. Such gross features may readily be identified by conventional or hyperspectral imaging using broad-band illumination centered upon the visible spectrum. The spectral distribution of the illuminant may however be usefully biased towards the red (necrotic tissue appearing blue may be contrast enhanced by reddish light) or toward the blue, for example, subdermal bleeding damage may be better discriminated in bluish light. Although this may marginally improve the spectral resolution of conventional imaging, it can do little for hyperspectral imaging, whose spectral resolution advantage is already fully exploited. Successive images may however be exploited collectively with enhanced information content. Using well known image processing techniques, this enhanced information may be obtained in one or more of four ways, which are the subjects of this patent application.

The first enhancement is to use illumination of the scene with the sequential application of two or more illuminants of different spectral distributions. Although the pixel by pixel resolution is not thereby enhanced for hyperspectral detection, the signal-to-noise ratio (SNR) of the signal from each pixel may be improved by having a different multiplier $I(x,y,\lambda)$, which is normally held fixed, and ensemble averaging the semi-independent signals. This is most powerfully effective in combination with the other techniques described below.

The second enhancement is logically extended from the first by noting that the two or more images with different illuminants can likely be slightly displaced, particularly if the system acquiring the images is a hand-held device. Given the displacement, individual areas in the image will fall on array elements with different hyperspectral wavelength sensitivities $M(x,y,\lambda)$ and will yield different signals. Commonly available software for 'stitching' together differently displaced pictures may be applied to give better spatial resolution without sacrificing spectral resolution, although naturally the total signal available has not been increased. This may be exploited in two ways. First, the separately measured values of intensity signals $P(x,y)$ may be used directly to give separable values of scattering coefficient $R(x,y,\lambda)$ over a range determined by the amount of image displacement and the specific distribution pattern of the array of narrow-band filters. Second, the differential intensity signal $P(x,y)$ based on the intensity signal from adjacent or proximate pixels can enhance even spectral resolution, without further loss of spatial resolution in the same way that the color sensitivity in human vision is enhanced by differential signals from cones with different spectral sensitivities. This spatial differentiation is analogous to the ability in human vision of nystagmus (sometimes microsaccades), or indeed the larger saccades themselves, to provide the sub-pixel resolution associated with 'vernier acuity', without impairing spectral capability.

The third enhancement is the optimal choice of spatial arrangement of the filters applicable to each individual pixel. One embodiment includes a pattern based upon the 'magic square' type arrangement that distributes a linear sequence of numbers (e.g. spectral peaks) over a two-dimensional pattern preserving local (ensemble averaging over several pixels) uniformity while maximizing the difference between adjacent pixels (see below).

The fourth enhancement is to provide an illumination that is so narrow in bandwidth that it occupies only one hyperspectral window or it may even be outside the band of any of the windows. This arrangement offers the ability to detect inelastic scattering from any of the structures in the field of view since only the pixels that admit the shifted wavelength will give rise to a signal. The SNR improvement is enhanced by this 'dark field' design, which now becomes sensitive to fluorescence and/or Raman scattering from specific structures in the field.

More specifically, disclosed is a hyperspectral imaging system comprising: an imaging sensor array including an array of pixels configured for outputting electrical signals in response to receiving light reflected from, transmitted through, or scattered by a target scene; an array of light filters configured for filtering the light reaching the pixels of the imaging sensor; and a controller adapted to: acquire into a memory of the controller from the imaging sensor array a plurality of images of the target scene during movement or dithering of the combination of the imaging sensor array and the array of light filters, wherein said plurality of images as acquired are spatially shifted with respect to each other; and process the plurality of acquired images in the memory of the controller to spatially align said plurality of images based on at least one common image feature in said plurality of images.

Each image can include the electrical signals output by the array of pixels of the imaging sensor array at the same time or substantially the same time.

The array of light filters can include light filters that are configured to filter different center, peak transmission wavelengths of light.

Adjacent light filters of at least a portion of the array of light filters can be configured to filter different center, peak transmission wavelengths of light.

The array of light filters can include a $n^2$ array of light filters, where n is a positive integer that is >1. The light filters of the $n^2$ array of light filters can be configured to filter different center, peak transmission wavelengths of light.

Sums of optical power transmitted by the light filters of each row and column of the array of light filters can be the same or substantially the same.

The hyperspectral imaging system can further include a device for moving or dithering the combination of the imaging sensor array and the array of light filters.

The hyperspectral imaging can further include the controller adapted to synchronize said movement or dithering and said acquiring of images such that the plurality of images as acquired are spatially shifted with respect to each other.

Also disclosed is a hyperspectral imaging system comprising: a plurality of illumination sources, each having a different spectrum, for outputting light for reflection by, transmission through, or scattering by a target scene; an imaging sensor array including an array of pixels configured for outputting electrical signals in response to receiving the light reflected from, transmitted through, or scattered by the target scene; and a controller adapted to: acquire into a memory of the controller from the imaging sensor array a first image of the target scene illuminated by a first one of the plurality of illumination sources; acquire into the memory of the controller from the imaging sensor array a second image of the target scene illuminated by a second one of the plurality of illumination source; and generate hyperspectral data for each pixel of the imaging sensor array based on data for said pixel included the first and second acquired images.

Each image can include the electrical signals output by the array of pixels of the imaging sensor array at the same time or substantially the same time.

The first and second illumination sources can have either overlapping or non-overlapping spectra. At least one of the illumination sources can be a monochromatic illumination source or a white illumination source.

Also disclosed is a method of hyperspectral imaging using an imaging sensor array including an array of pixels configured for outputting electrical signals in response to receiving light reflected from, transmitted through, or scattered by a target scene and an array of light filters configured for filtering the light reaching the pixels of the imaging sensor. The method comprises: (a) acquiring from the imaging sensor array a plurality of images of the target scene during movement or dithering of the combination of the imaging sensor array and the array of light filters, wherein said plurality of images as acquired are spatially shifted with respect to each other; (b) processing the plurality of acquired images to spatially align said plurality of images based on at least one common image feature in said plurality of images; and (c) following step (b), generating hyperspectral data based on the aligned images.

Each acquired image can include the electrical signals output by the array of pixels of the imaging sensor array at the same time or substantially the same time.

The array of light filters can comprise plural rows and plural columns of light filters. Adjacent light filters of at least a portion of the array of light filters can be configured to filter different center, peak transmission wavelengths of light.

Sums of optical power transmitted by the light filters of each row and column are the same or substantially the same.

Lastly, disclosed is a method of hyperspectral imaging using a plurality of illumination sources, each having a different spectrum, for outputting light for reflection by, transmission through, or scattering by a target scene and an imaging sensor array including an array of pixels configured for outputting electrical signals in response to receiving the light reflected from, transmitted through, or scattered by the target scene. The method comprises: acquiring a first image of the target scene illuminated only by a first one of the plurality of illumination sources; acquiring a second image of the target scene illuminated only by a second one of the plurality of illumination source; and generating hyperspectral data for each pixel of the imaging sensor array based on data for said pixel in the first and second acquired images.

Each image can include the electrical signals output by the array of pixels of the imaging sensor array at the same time or substantially the same time.

The first and second illumination sources can have either overlapping or non-overlapping spectra. At least one of the illumination sources can be a monochromatic illumination source or a white illumination source.

BRIEF DESCRIPTION OF THE DRAWINGS

FIG. 4A shows one version of a very large number of possible hyperspectral masks where the numbers in the boxes correspond to an ordered sequence of filters in the spectral domain, i.e., "1" corresponds to a first filter configured to filter a first spectrum, "2" corresponds to a second filter configured to filter a second spectrum, and so forth (see FIG. 2);

FIG. 4B is an illustration of a hyperspectral mask including four of the hyperspectral masks of FIG. 4A, which may be replicated with rotation, reflection, permutation or combination across the entire sensor array;

DESCRIPTION OF THE PREFERRED EMBODIMENTS

Figures 1A, 1B:
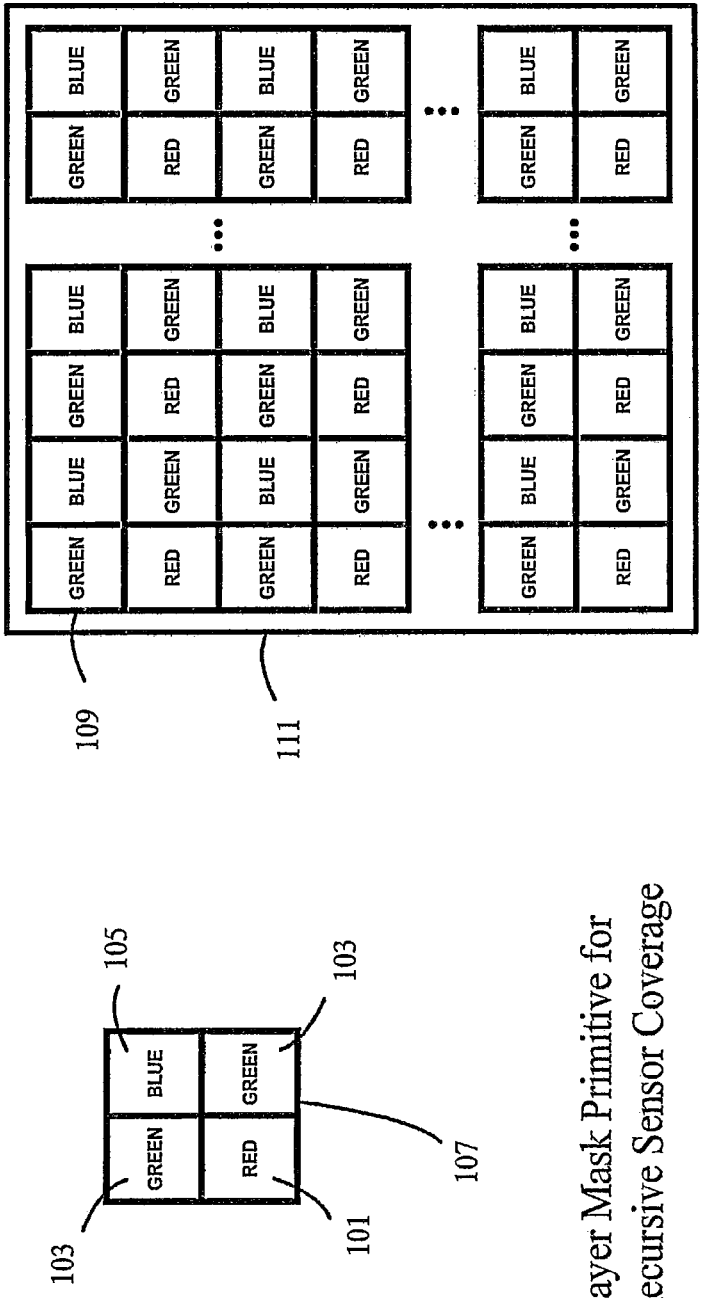
FIG. 1A is an illustration of a conventional Bayer (or color) mask primitive used throughout the digital photography industry with a charge coupled device (CCD) or a complementary metal oxide semiconductor (CMOS) sensor array.
FIG. 1B is an illustration of the mask primitive shown in FIG. 1A replicated over an entire sensor pixel array.

In the above summary, and the following detailed description, reference is made to FIGS. 1-6. This application incorporates by reference the disclosure of international application no. PCT/US13/23813, titled "Hyperspectral Imaging Systems, Units, And Methods", filed on Jan. 30, 2013.

In one preferred and non-limiting embodiment, the system comprises a hyperspectral sensor array where each elementary pixel sensor is preceded by its own narrow-band filter, upon which is imaged an area of interest on or in a body in question by an optical system with adequate capabilities over the required spectrum, and a number of sequentially available illuminators, which may include broad-band sources of different spectral distributions and/or narrow-band illuminants such as lasers or light emitting diodes. FIG.

3 shows five possible illuminant spectral distributions I(λ), where each may be varied, for example the narrow band source may be anywhere within, or for some types of fluorescence outside, the visible spectrum. Images may be acquired singly or sequentially with different illuminants or with small linear displacements. The imaged area may include, but not be limited to, skin in various locations and exhibiting normal or abnormal signs including physical damage, lesions, wounds, boils, rashes, moles, etc., and structures visible within the eye, ear, nose, throat, rectum, vagina, etc., whose enhanced hyperspectral image offers the observer far more feature-rich information than with conventional illumination or camera sensitivity. With accidental or specifically applied image 'dither' and the application of image post-processing briefly exemplified below, even more precise and comprehensive spatial and spectral details become readily accessible.

The performance of the hyperspectral camera-like configuration may be enhanced by different illuminants in temporal sequence, where each conventionally acquired frame may be related to other frames that may be differently illuminated and/or physically slightly displaced. Since the signal from each pixel is the integral over illuminating wavelength, scene response function, filter transmission, and detector sensitivity as described above, changing any one or more factors between frames can allow the recovery of substantial extra information. The illumination shift of broad-band illumination from predominantly blue through green to predominantly red, or white, can selectively bias the appearance of the scenes allowing independent measurement of SNR, particularly if the spectral response is widely different across the scene, although it need not contribute directly to spectral resolution improvement.

Successive static images may have a rather small SNR enhancement by change of illuminant, but if two or more successive images also have small lateral displacements, conventional software used to compensate such linear blurring can accomplish far more than its usual spatial requirement. Specifically for hyperspectral imaging, but equally applicable to other types of implementation, where either the illuminant remains constant or is changed, differences between images can be used to recover, or even enhance the spatial resolution beyond the typical pixilation by which it is otherwise limited. Again specifically, but with greater enhancement for hyperspectral imaging, similar image features are now viewed through different narrow-band filters and may thus also be subject to significant spectral resolution enhancement. These advantages may be taken in either spatial or temporal domains with their product limited by the additional information obtained by acquiring several frames in rapid succession—that is before the scene changes significantly. With proper processing, as is well understood in the art, the improvement in spatial resolution is typical of that exploited by the most highly evolved biological life Runs, while the spectral enhancement is simultaneously both greater and over a larger spectral range than achieved by any individual life form (for examples, vultures have excellent resolution but less good color identification, octopi have excellent color separation but less good spatial resolution, cats have poor spectral and spatial resolution, but excellent motion detection). A primary purpose of saccades in commonly evolved living organisms is to overcome local sensor adaptation, but although that is not the problem here, the mechanism offers unique advantages.

The physical and spatial distribution of the individual hyperspectral filters may be selected on the basis of algorithms such as the commonly used Bayer mask, but for the optimum advantages to be obtained by dithering the image (as described below) the ideal distribution would be one that maximizes the spectral contrast enhancements for the smallest displacement. The most desirable properties of the mask are that the local spectral difference between adjacent pixels shall be as large as possible in all directions, while the ensemble average of the sensitivities of any small group of adjacent pixels shall be as uniform as possible over the field. This may be accomplished in a variety of ways and several mathematical tools are available for its two-dimensional optimizations. To enhance high spatial frequency response without compromising uniformity and stability a pixel array may be formulated according to Walsh-Hadamard functions. These Walsh-Hadamard arrangements typically provide for the optimization of 1-bit level transitions in selected patterns that preserve a uniform 'sequency' of short and long ranges. To accommodate the presence of a significant number of levels, corresponding to a number of different spectral filters, the optimization requires a further condition, that the response difference between adjacent pixels be as large and as uniform as possible. Such an arrangement may be well described by a 'magic square' concept, whereby a numerical progression of integers (corresponding to a sequence of filters) is arranged in a square such that all the numbers in a row or column add to the same value—'perfect' orders also allow such a constant sum on the diagonal and any local sub-matrix comprising a symmetrical array of a number of pixels, which is the same as the order of the matrix. Such a perfect structure is shown as the primitive of FIG. 4A, but it is not necessarily the optimum choice for this application to hyperspectral imaging, where optimization may depend on other features such as, for example, aspect ratio and number of pixels in the complete sensor array (it need not be square), and the interval, rotation and/or reflection of the recurrence of each primitive. Exploration of magic squares using various algorithms produces improvement of edge contrast between all pixels in a sub-array and can minimize the edge effects of recurrence boundaries. The types of spatial arrangement of filters introduced here are by no means the only possible arrangements, nor need the number of filters be restricted to any specific number or class of number, such as $n^2$, which arise as an immediately attractive possibility for simple implementation. Much more complex arrays may be chosen and optimized based upon a large number of criteria that will be obvious to one skilled in the art, but whose specific arrangement may not be so easily optimized as by using the method(s) described herein.

Figure 5:
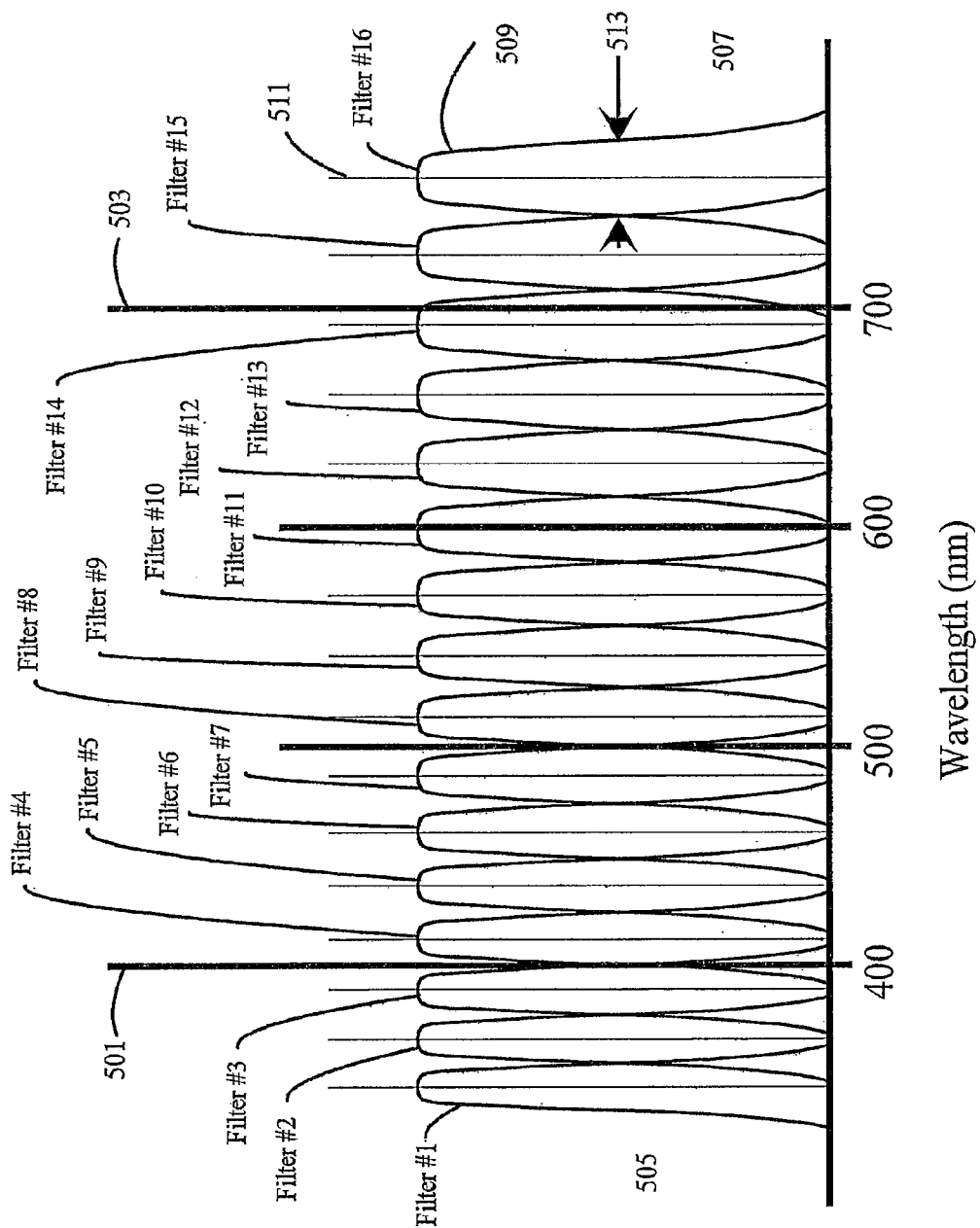
FIG. 5 shows the transmission spectrum of the sixteen filters (filter #1, filter #2, filter #3, etc.) of the hyperspectral masks shown in FIGS. 4A and 4B, wherein filter #1 corresponds to the number "1" in FIGS. 4A and 4B; filter #2 corresponds to the number "2" in FIGS. 4A and 4B; and so forth.

Not only is the choice of mask layout important but the choice of filters is also a free variable. FIG. 5 shows a typical spectral range where idealized filters select identical blocks of transmission bandwidth with a linear progression of identical intervals across and beyond the visible spectrum in both directions. However, filter properties need not be uniform. Each filter may be independently specified by its nominal center frequency, its transmission peak height scaling, its average bandwidth, and further details of its spectral shape. At a higher hierarchical level, the number of filters, the range over which the number of filters are distributed and the overlap with adjacent filters may also be tailored to the requirements of the specific application for which the system is to be optimized. While these are probably unnecessary sophistries, their optimized choice is certainly capable of increasing the product of spectral and spatial resolution for a given electrical output transmission bandwidth.

The acquisition of a static image from such a hyperspectral sensor can give valuable information about the distribution of reflective (scattering) or transmissive properties of elements in the scene, but the spatial resolution is limited by the average separation of pixels with common spectral filters. By taking a succession of images whose frames are slightly displaced the change in individual pixel response from frame to frame can, with proper two-dimensional image processing actions which are well known in the art, yield substantial improvements in both spatial and spectral domains, presuming that the internal properties of the scene itself do not change too much between frames. The nature of the lateral frame shift can be a small dither, such as might be automatically available from a hand-held device or it might be by deliberately induced physical jitter from a vibrating source inducing the equivalent of visual microsaccades (nystagmus). Larger movements in any direction in the plane of the image may sweep the image across several or many pixels allowing a substantial enhancement of both spatial and spectral resolutions at the expense of more images, which for a constant illumination power, or data transmission rate will take a longer time. While information about small and possibly random image shifts may be obtained from the image itself, if an accelerometer is available it can provide 'a priori' data to ease the processing load by knowing the exact lateral displacement direction and amount.

The nature of the pixel mask, the spectral filters and the image movement must be simultaneously optimized for any given application. One example is illustrated in FIGS. 4A, 4B and 5 for spatial and spectral distributions. No figure is given for the image displacement, which is merely a shift across a quasi-static scene by varying amounts normal to the optical axis of the sensor array. The trade-off parameters are listed in Table 2 below but unfortunately not all parameters are either orthogonal or completely independent. Even within these parametric classes, individual element may be differently optimized, leading to a design space of great freedom. Fortunately the establishment of optimization criteria may be well defined for any specific application. At the topmost level, these are the relative weights and total product of the three global variables, spatial resolution, spectral resolution, and number of independent frames available or required. The maximum value of this product is determined by the illumination power, the detector sensitivity, and the transmission bandwidth, in terms of the basic SNR of each pixel, and of the SNR of the aggregate processed images. Within this maximum value there is the freedom of choice to optimize the variables shown in Table 2.

TABLE 2

Optimization Variables

Spectral Resolution

Total Number of Individual Filters
Center Wavelength of Each Filter
Width and Transmission Distribution of Each Filter
Overlap between Adjacent Filters (differential transmission)
Peak and Total Intensity Transmission
Spatial Resolution 2-Dimensional Filter Primitive Arrangement †
Filter Arrangement in each Primitive
Choice of Primitives and their Sequence(s) in 2-Dimensions ‡
Recursion Range including Rotation or Reflection of Primitives
Image Displacement Direction in two dimensions
Amount of Displacement (expressed in average or equivalent pixels)
Relationship between Frame Interval and Displacement TABLE 2-continued Optimization Variables Common Constraints Image Acquisition Time
Number of Images Acquired
Ensemble-averaged Signal Strength (Local and General SNR)
Transmission Bandwidth
Image Processing Resources † The filter arrangement need not be generated by recursion of one or more primitives, although this is much simpler to specify and analyze. The arrangement could be completely free across the sensor, and it is possible that this or even a random arrangement in two dimensions might actually have some overall advantage, although this is not yet quantified.
‡ Subsets of one or more primitives with local optimization (e.g. a formally chosen magic square or equivalent) may be replicated with a large range of choices within conditions determined by properties of the sensor array to be masked, and indeed the specific application.

The criteria for optimization are straightforward but the achievement of a true optimum may be computationally impractical. A tradeoff must be made between implementation practicality and quality of performance in the domain of current interest. This may differ from one application to another, even within the field of medical imaging and feature extraction. It may also be extended to any other type of hyperspectal information recovery optimization.

Such a hyperspectral imaging device may also offer certain important advantages for image detection of low levels of inelastically scattered light. One advantage is that a monochromatic illuminant may lie outside the pass-band of any of the hyperspectral filters, as exemplified in the illuminant spike (309) outside the non-dotted band in FIG. 3, which of course applies equally to the applications shown in FIG. 5. Typically the illumination is of a shorter wavelength than that detected as energy is lost and wavelength increased by inelastic scattering, but the possible energy increase from two-photon scattering should not necessarily be excluded. For elastic scattering the observed field would then be dark, and contain no information. Any materials that scatter inelastically, that is, where the scattered wavelength differs from the illuminating wavelength, may produce a signal from the appropriately filtered pixel. The immediate application of this is to give a highly sensitive detection of material that may exhibit fluorescence, either artificially induced or indicative of a pathological condition. Since the field is otherwise dark the discriminability is greatly enhanced over conventional illumination. The product of sensitivity and spectral resolution of a hyperspectral camera enhanced as described here may be sufficient to detect a number of materials at concentrations of medical interest.

Shifting the monochromatic wavelength to be within the pass-band of one filter will light only those pixels accepting elastically scattered light at that wavelength. Although this may increase the background veiling luminance and reduce the resolution enhancement by a small amount, the bright pixels also give a clear registration of key elements of the image in question from pixel-to-pixel and thus can be an excellent calibration of the movement between frames. Having this as an independent measurement improves the derivation of differential information from different image shifted frames without the need to use precious processing capability such as correlating complete images to find the frame displacement. An accelerometer to which we alluded above may also help with this.

Given the general capability of illuminating the scene with different wavelengths and wavelength distributions, it becomes practical to analyze each image or set of images to enhance specific features, or make visible features that were not formerly detectable. Conventionally available image adjustments such as brightness, contrast, gamma, dynamic range and false color may be applied to highlight specific features, but the additional spectral resolution of hyperspectral imaging becomes available with less loss of resolution than might be supposed by the sparsity of the filter mask. There is already a direct product relationship between the number of different spectral filter elements and the resolution available. In one preferred and non-limiting embodiment, the present invention ameliorates the information loss by reducing this product by alternative techniques. Given the rapidly growing field of image processing capability and conditional analysis, an autonomous system may ultimately be envisaged that would seek a large number of pathological conditions in the time that a physician would look at a single less informative image.

FIGS. 1A and 1B, which are included as background information, show the structure of the conventional Bayer mask used throughout the digital photography industry. As shown in FIG. 1A, three color filters are arranged in a usually square grid, where one corner is red (101) two adjacent corners are green (103) and the remaining opposite corner is blue (105). The complete pattern (107) of three colors typically covers four pixels of the sensing array, and, as shown in FIG. 1B, is replicated indefinitely (109) to cover the available sensor area (111).

Figure 2:
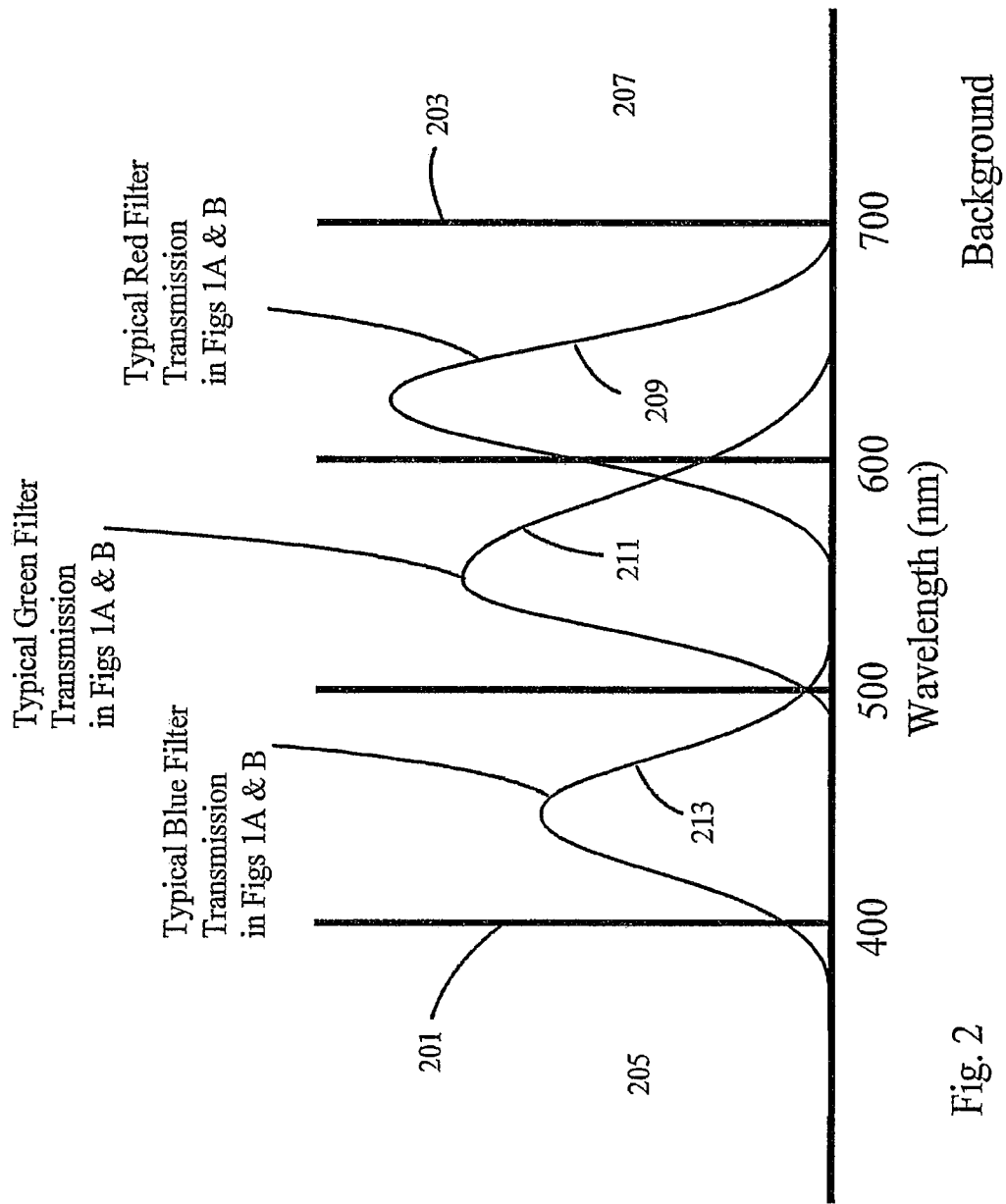
FIG. 2 shows exemplary transmission wavelength curves of the blue, green and red filters from left to right (conventionally RGB) shown in the masks of FIGS. 1A and 1B.

FIG. 2 is also included as background information to show typical transmission curves for the three color filters distributed over the conventionally defined visible spectrum from 400 nm (201) to 700 nm (203), where the ultraviolet region beyond the blue wavelengths is less than 400 inn (205) and the infrared region beyond the red wavelengths greater than 700 nm (207) indicate regions normally invisible to a human eye, although some differences do exist between people. The predominantly red transmission filter (209), the predominantly green transmission filter (211), and the predominantly blue transmission filter (213) show a substantial overlap rather similar to the three color sensitivities of the cone system in the human retina (which together with rods is vastly more complex), because the mask is typically intended for color rendition of humanly visible scenes. The ordinate (or Y-axis) in FIGS. 2, 3 and 5 is representative of logarithmic intensity or transmission and is qualitative for illustrative purposes only.

Figure 3:
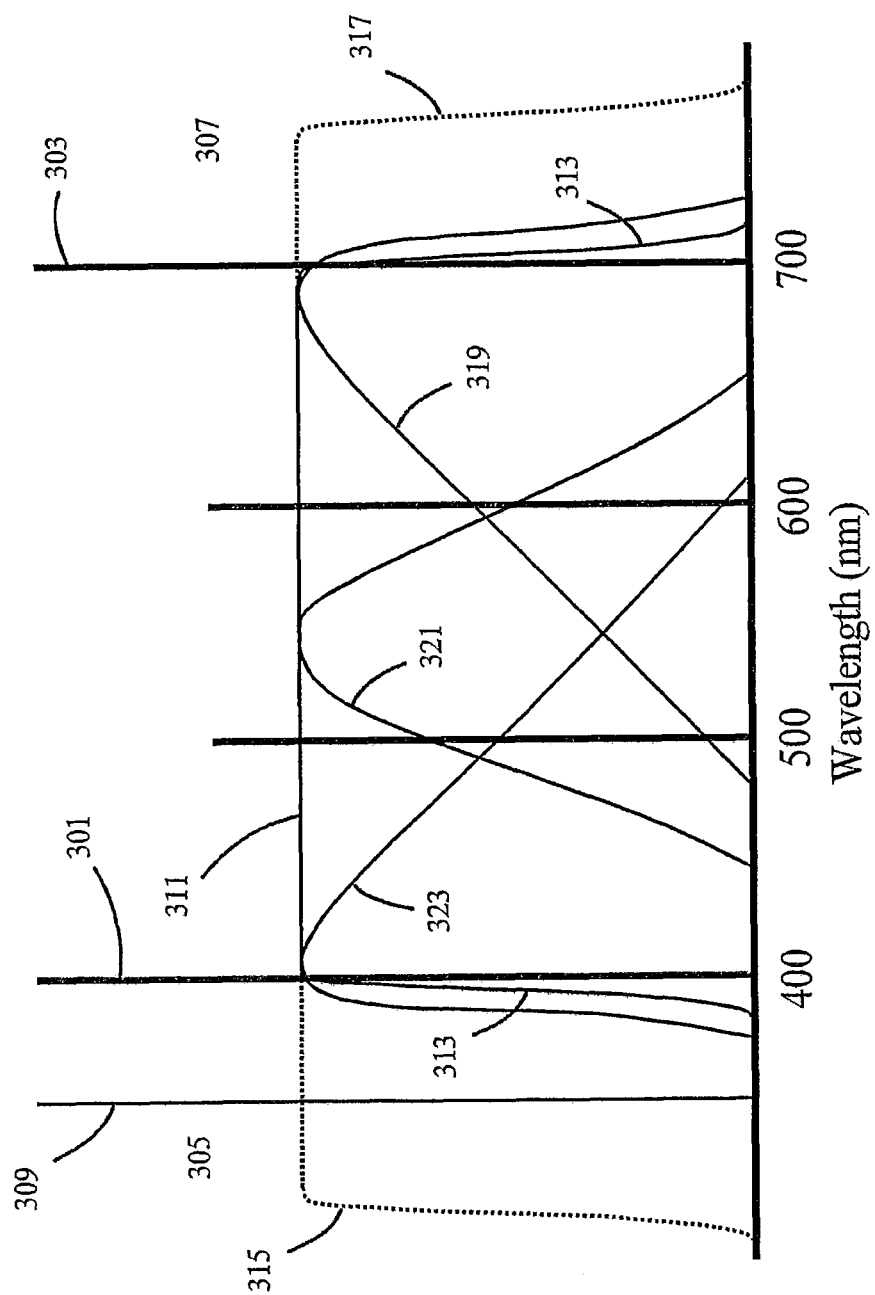
FIG. 3 shows five possible types of illuminating radiation distributed over the wavelength spectrum of and beyond that of FIG. 2 and covering that of FIG. 5, including a monochromatic source (309), which may be at any wavelength, a white illumination or light source (311) which may extend into ultraviolet (315) and/or infrared (317), a predominantly red illumination or light source (319), a predominantly green illumination or light source (321), and a predominantly blue illumination source (323)

FIG. 3 shows five possible types of illuminating radiation 309, 311, 319, 321 and 323, distributed over the spectrum illustrated and already described in FIGS. 2 (201-203) and repeated in FIGS. 5 (501-503). The first is a monochromatic source (309), which may be placed anywhere in the spectral range shown in the figure. It may be a laser diode with varying degrees of spectral purity from highly coherent to merely narrow-band, and may stimulate elastic and/or inelastic scattering from different elements of the scene. The second potential illuminant shown is white light (311) for general illumination. Although this illuminating spectrum is shown by (two solid lines 313 and line 311) to fall to near zero outside the conventional visible spectrum, this is by no means a necessary requirement, as is shown by extension in the dotted lines corresponding to ultraviolet (315) and infrared (317). To be useful, this extension presumes that detector has acceptable sensitivity in these regions. The remaining three illuminants are based upon predominantly reddish (319), predominantly greenish (321), and predominantly bluish (323) with overlapping ranges that are more applicable to objective spectral separation than tailored to simulate effects of the human visual system. The choice of spectral distribution of illuminant is typically made based upon the scene and the features to be extracted therefrom. Changing the illuminant between successive images, which may then either be compared, summed or otherwise processed with spatially or spectrally discriminatory methods may enhance SNR and/or spatial and/or spectral resolutions.

FIGS. 4A and 4B show examples of one of a very large number of possible hyperspectral masks where the numbers in the boxes (401 for the number 12, corresponding to filter 12 in FIG. 5) correspond to the ordered sequence of filters in the spectral domain shown in FIG. 5. FIG. 4A shows a simple low order perfect magic square configuration where all rows, columns, major diagonals, and adjacent blocks of four filters contain numbers that sum to 34. The single primitive filter array shown (403) is based upon having 16 hyperspectral filters (corresponding in this example to filters 1-16 in FIG. 5) in the spectral range of interest, but obviously a wide range of variables and the possibilities of optimization are available as expanded in the ideas of Table 2. Any square primitive filter array itself is convenient for numbers of spectral filter arrays given by $n^2$ where n is an integer greater than 2 (the value of n for the Bayer mask is 2, but the duplication of green make this semi-degenerate). FIG. 4B is exemplary of an n=4 filter array. Typical values of n for hyperspectral imaging represent the equivalent 'finesse' of the spectral dispersion resolution. For example, n=7 gives a finesse of 128, the number of necessary non-overlapping filters. Naturally there will be some filter overlap, and that also can be turned to good effect by the 'dither' proposed here. Any primitive filter array may be packed into a total filter array (409), either by simple replication (405), or by having adjacent primitives rotated (407 shows 180 degrees) or reflected, preserving symmetry but changing local effectiveness.

FIG. 5 shows an array of 16 identical filter transmission windows, corresponding to filters 1-16 in FIGS. 4A and 4B, covering a range (505-507) somewhat greater than the conventional visible spectrum (501-503). Each filter shown (example 509) has a specific center wavelength (example 511) and a typical half height bandwidth (example 513). The intervals and bandwidths are shown as linearly scaled across the spectrum, but obviously this is not a necessary property. All three properties including the spectral shape may be individually defined for each filter in more complex ways, as might be necessary or desirable. The number of filters need not be constrained by the formula in the description of FIG. 4 (e.g. for Bayer the number of different filters is 3), but then optimizing the mask distribution may become more complex, particularly where the number of different filters becomes large.

Figure 6:
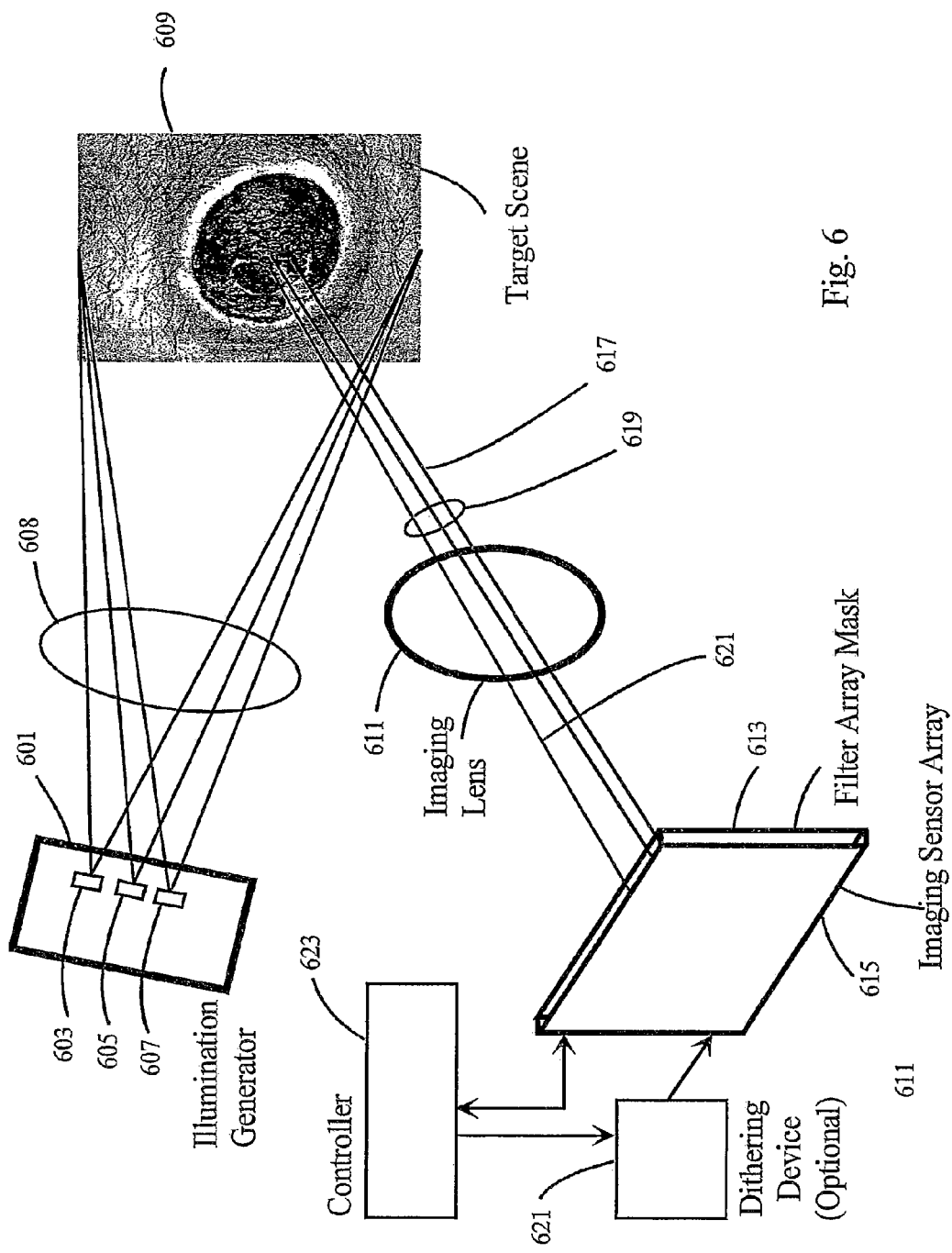
FIG. 6 is a schematic of an exemplary hyperspectral imaging system including an illumination generator, which may have any chosen spectral emission, and showing how lateral displacement or rotation of an axis of the imaging sensor array may induce a small shift of an image on the combination filter mask and array sensor, which are fixed in registration with each other.

With reference to FIG. 6, an embodiment hyperspectral imaging system includes an illumination generator 601, which can include one or a plurality of illumination sources, e.g., illumination sources 603, 605, 607, for providing uniform illumination of a target scene 609. Incident light 608 generated by illumination generator 601 is transmitted through, reflected by, and/or scattered by a target scene 609 which, in response to interaction with said incident light 609, undergoes spectral modulation based upon local properties of target scene 609 to become reflected, transmitted or scattered light 619. Light 619 leaving target surface 609 can pass through and be focused by an optional imaging lens 611 onto a light filter array mask 613. Light passing through light filter array mask 613 falls on an imaging sensor array 615 which includes an array of pixels which are configured to convert the light passing through light filter array mask 613 into electrical signals which can be sampled by a controller 621, which also controls the sampling of imaging sensor array 615. Light filter array mask 613 and imaging sensor array 615 are positioned as close to each other as possible, desirably in intimate contact as a single fixed and registered component. The operation of the pixels of imaging sensor array 615 and controller 621 are conventional in the art and will not be described further herein.

Desirably, each filter of light filter array mask 613 overlies a single pixel of imaging sensor array 615. However, this is not to be construed as limiting the invention since it is envisioned that advantages may accrue from different coverage areas, e.g., a single filter of light filter array mask 613 overlying two or more pixels of imaging sensor array 615, or multiple filters of light filter array mask 613 overlying a single pixel of imaging sensor array 615. One exemplary, non-limiting example of the arrangement of the filters of light filter array mask 613 is the filter array 409 shown in FIG. 4B. However, this is not to be construed as limiting the invention since the use of filter array mask 613 having a different arrangement and/or number of filters, other the sixteen filters shown in FIG. 4B, is envisioned.

An optional movement or dithering device 623 may be coupled to the combination of light filter array mask 613 and imaging sensor array 615, which are desirably coupled together, to facilitate translation, movement or dithering thereof in concert.

In static operation, the hyperspectral imaging system shown in FIG. 6 has a fixed principal optical axis 617, allowing each element or portion of target scene 609 to be viewed through a specific, and in general, narrow-band filter of light filter array mask 613. This allows hyperspectral resolution of each element of target scene 609 with only the spatial resolution associated with the recurrence range of each filter, which, for the sixteen different filters shown for example in FIG. 4B, is typically a factor of four in each direction (x and y) in the focal plane of the sensor. Hence, a single hyperspectral image frame or scene acquired from all of the pixels of imaging sensor array 615 by controller 621 contains hyperspectral information, albeit at degraded spatial resolution—in contrast with the conventional pushbroom hyperspectral scanning, which must wait for the end of the scan before any useful information is available.

If two or more images or frames of target scene 609 shift slightly in the focal plane of imaging sensor array 615 between the acquisitions of said images by controller 621, either by translation of optical axis 617 or by slight angular redirection, these images will overlie different areas (pixels) of the uniformly sensitive imaging sensor array 615 but will be modulated by different filters of the displaced filter array mask 613. The difference between these shifted images can be processed by controller 621 in a manner to be described hereinafter to derive approximately a factor of two spatial resolution enhancement. As successive frames of the pixels of imaging sensor array 615 are acquired by and processed by controller 621 in the manner described hereinafter, the available spatial resolution steadily improves, becoming better even than the original pixilation. To this end, in a single frame, full hyperspectral resolution is acquired only over a relatively sparse array of the pixels in the spatial domain. The next, displaced, image also contains full hyperspectral resolution but over a different relatively sparse subset of the pixels of the same spatial domain, and so on. Controller 621 processing the acquired frames constructs a steadily improving filling of scalar elements in the three-dimensional datacube. Such interpolative acquisition of the datacube can allow a sequence of image acquisitions to be halted as soon as resolution is adequate for the purposes of interest, a potentially large improvement in data collection time over conventional hyperspectral modalities.

The registration of successive frames to allow differential image analysis from shifted frames acquired by controller 621 is readily accommodated by controller 621 by spatial correlation of image features in the frames that register signals at several wavelengths. Stated differently, operating under the control of a suitable software algorithm, controller 621 spatially adjusts (in a memory of controller 621) the registration of two or more image frames of target scene 609 acquired by controller 621 from imaging sensor array 615, where said image frames where shifted with respect to each other during the acquisition of said frames by imaging sensor array 615, to align one or more common image features of target scene 607 in said two or more frames, thereby aligning said two or more frames. This permits effective operation without specifically controlled dither, but by exploiting natural effects of image instability or other incidental jitter, caused for example by hand holding the device while capturing images of the scene. It is also envisioned to impose externally quantified jitter, e.g., via optional dithering device 623, at specific rates and in specific directions to optimize the data gathering for particular scenes of situations. In this regard, controller 621 can synchronize the dithering of imaging sensor array 615 with the acquisition of image frames.

FIG. 6 also shows that target scene 609 may be illuminated by one or a plurality of illumination sources, e.g., illumination sources 603, 605, 607. This allows sensitivity enhancement of specific target scenes, e.g, scene 609, that may have a predominant color, such as, for example, blood covering a wound or other incisions. Such additional selective enhancement of signal is applicable in many scenes of medical or other interest where the predominant optical modulation is elastic scattering, that is where the elements of the scene modulate the intensity of the light but do not change its frequency.

For a target scene 609 that may include specimen features that produce inelastic scattering, such as fluorescence, the illumination source, e.g., illumination source 603, 605, or 607, may be chosen predominantly to excite such frequency shifts and could be within the spectrum of a single filter of filter array mask 613, to assist with registration, or outside any of the filters of filter array mask 613 to provide 'darkfield' contrast, and hence a significant improvement in image signal-to-noise ratio.

In another method of operation of the hyperspectral imaging system of FIG. 6, if more than one illumination source is to be used to illuminate target scene 609, then each illumination source is activated, one-at-a-time, during the acquisition by controller 621 of an image frame from the pixels of imaging sensor array 615 specific to that illumination source, with or without dithering or shifting of filter array mask 613 and imaging sensor array 615. For example, controller 621 acquires a first frame (or image) from the pixels of imaging sensor array 615 in response to target scene 609 being illuminated only with light from illumination source 603, i.e., when target scene 609 is not being illuminated with light from illumination sources 605 and 607, e.g., when illumination sources 605 and 607 are not being illuminated. Thereafter, controller 621 acquires a second frame (or image) from the pixels of imaging sensor array 615 in response to target scene 609 being illuminated only with light from illumination source 605, i.e., when target scene 609 is not being illuminated with light from illumination sources 603 and 607. In other words, the acquisition of each of two or more frames or images by controller 621 is synchronized with the illumination of a unique one of the plurality of illumination sources 603, 605, or 607, with each image being acquired for a unique one of the illumination sources. Each acquired image includes hyperspectral data for each pixel, with two or more images acquired in this manner offering differential information based on the electrical signals acquired by each pixel during the acquisition of said two or more images.

The plurality of illumination sources, e.g., illumination sources 603, 605, or 607, can have overlapping or non-overlapping spectra. One or more of the illumination sources can be monochromatic. One of the illumination sources can be a typically 'white' illumination source, which may offer useful advantages for spectra coverage, calibration, information optimization and possible other capabilities, such as normal imaging to show the scene in a more conventional appearance, for example by pixel aggregation and/or differentiation.

Advantages of the hyperspectral imaging system shown in FIG. 6 include: an increase of information available from hyperspectral imaging by using a sequence of images or scenes acquired in response to moving or dithering the image of the scene on the light filter array mask 613 which is desirably fixed to the imaging sensor array 615 to increase the spatial and spectral resolutions of target scene 609, such as a part of a human body; improvement of signal-to-noise ratio (SNR) in a hyperspectral image with a wide range of optical response levels by analysis of pixels that are differently illuminated; and a spatial arrangement of individual filters M(x,y) over the pixels S(x,y) of imaging sensor array 615, whereupon differences of transmission properties between adjacent filters can be consistently maximized. This last advantage may be accomplished by one or more "magic square" patterns, which may be replicated with translation, rotation or reflection to optimize distribution of chosen filters over the imaging sensor array or any other pattern with properties optimized for a specific application.

While the embodiment of the hyperspectral imaging system shown in FIG. 6 was described in connection with a constant illuminant for a sequence of images, it is to be appreciated that this is not to be construed as limiting the invention since illumination generator 601 can include any number of illumination sources, each having a different spectral distribution, used simultaneously or sequentially to generate hyperspectral data for each pixel of the imaging sensor array from the plurality of acquired frames or scenes.

The use of one or more narrow-band illumination sources within the illuminating generator 601 in FIG. 6 facilitates the detection of inelastic scattering from a specific wavelength to enhance the visibility of structures such as those that may contain natural or disease induced fluorescent molecules or those from which Raman scattering may be made detectible by viewing against a dark field, with a possible extension to the detection of elastic scattering utilizing a broad-band light illumination source or illuminant to illuminate specific pixels for registration of one or more hyperspectral images obtained via inelastic scattering using one or more narrow-band illumination sources with a hyperspectral image formed by detection of elastic scattering using a broad-band illumination source or illuminant.

The present invention has been described with reference to the accompanying figures. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A hyperspectral imaging system comprising:
a plurality of illumination sources in fixed positions to output light toward a target scene;
an imaging sensor array including an array of pixels configured for outputting electrical signals in response to receiving light reflected from, transmitted through, or scattered by the target scene;
an array of light filters over the imaging sensor array, the array of light filters configured to filter light before reaching the pixels of the imaging sensor array; and
a controller coupled to the imaging sensor array, the controller having a memory;
wherein the controller is adapted to:
acquire into the memory from the imaging sensor array a plurality of images of the target scene during movement or dithering of the combination of the imaging sensor array and the array of light filters, wherein said plurality of images as acquired are spatially shifted with respect to each other, and wherein at least one single image of the plurality of images includes hyperspectral information; and
process the plurality of acquired images in the memory of the controller to spatially align said plurality of images based on at least one common image feature in said plurality of images.

2. The hyperspectral imaging system of claim 1, wherein each image includes the electrical signals output by the array of pixels of the imaging sensor array at the same time or substantially the same time.

3. The hyperspectral imaging system of claim 1, wherein the array of light filters includes light filters that are configured to filter different center, peak transmission wavelengths of light.

4. The hyperspectral imaging system of claim 3, wherein adjacent light filters of at least a portion of the array of light filters are configured to filter different center, peak transmission wavelengths of light.

5. The hyperspectral imaging system of claim 1, wherein:
the array of light filters includes an N by N array of light filters, where N is a positive integer that is greater than one; and
one or more of the light filters in the N by N array of light filters are configured to filter different center, peak transmission wavelengths of light.

6. The hyperspectral imaging system of claim 5, wherein sums of optical power transmitted by the light filters of each row and column of the array of light filters are the same or substantially the same.

7. The hyperspectral imaging system of claim 1, further including a device for moving or dithering the combination of the imaging sensor array and the array of light filters.

8. The hyperspectral imaging system of claim 7, further including the controller adapted to synchronize said movement or dithering and said acquiring of images such that the plurality of images as acquired are spatially shifted with respect to each other.

9. A hyperspectral imaging system comprising:
a plurality of illumination sources in fixed positions, each illumination source having a different spectrum, for outputting light for reflection by, transmission through, or scattering by a target scene;
an imaging sensor array including an array of pixels configured for outputting electrical signals in response to receiving the light reflected from, transmitted through, or scattered by the target scene;
an array of light filters over the imaging sensor array, the array of light filters configured to filter light before reaching the pixels of the imaging sensor array; and a controller adapted to:
  acquire into a memory of the controller from the imaging sensor array a first image of the target scene illuminated by a first one of the plurality of illumination sources during movement or dithering of the combination of the imaging sensor array and the array of light filters, wherein the first image includes hyperspectral information;
  acquire into the memory of the controller from the imaging sensor array a second image of the target scene illuminated by a second one of the plurality of illumination sources during movement or dithering of the combination of the imaging sensor array and the array of light filters, wherein the second image includes hyperspectral information; and
  generate hyperspectral data for each pixel of the imaging sensor array based on data for said pixel being included in the first and second acquired images.

10. The hyperspectral imaging system of claim 9, wherein each image includes the electrical signals output by the array of pixels of the imaging sensor array at the same time or substantially the same time.

11. The hyperspectral imaging system of claim 9, wherein the first and second illumination sources have either overlapping or non-overlapping spectra.

12. The hyperspectral imaging system of claim 9, wherein at least one of the illumination sources is a monochromatic illumination source.

13. The hyperspectral imaging system of claim 9, wherein at least one of the illumination sources is a white illumination source.

14. A hyperspectral imaging system comprising:
  a plurality of illumination sources in fixed positions to output light toward a target scene;
  an imaging sensor array including an array of pixels configured to generate electrical signals in response to receiving light associated with the target scene;
  an array of light filters over the imaging sensor array, the array of light filters being adapted to filter light before it reaches the array of pixels of the imaging sensor array; and
  a controller coupled to the imaging sensory array; and
  a storage device coupled to the controller;
  wherein the controller is adapted to:
    receive the electrical signals from the imaging sensor array;
    store data representing the electrical signals into a storage device to capture a plurality of images of the target scene, wherein the plurality of images of the target scene are captured during movement of the imaging sensor array and/or the array of light filters or the dithering of the imaging sensor array such that they are spatially shifted with respect to each other, and wherein at least one single image of the plurality of images includes hyperspectral information; and
    spatially align the plurality of images of the target scene based on at least one common image feature in the plurality of images.

15. The hyperspectral imaging system of claim 14, wherein the storage device is memory.

16. The hyperspectral imaging system of claim 14, wherein a frame of data stored in the storage device represents the capture of an image by the array of pixels of the imaging sensor array at the same time.

17. The hyperspectral imaging system of claim 14, wherein adjacent light filters of at least a portion of the array of light filters are configured to filter different center, peak transmission wavelengths of light.

18. The hyperspectral imaging system of claim 14, wherein:
  the array of light filters includes an N by N array of light filters, where N is a positive integer that is greater than one; and
  one or more light filters in the N by N array of light filters are configured to filter different center, peak transmission wavelengths of light.

19. The hyperspectral imaging system of claim 18, wherein sums of optical power transmitted by the light filters of each row and column of the array of light filters are similar.

20. The hyperspectral imaging system of claim 1, further comprising:
  a dithering device to move or dither the imaging sensor array and/or the array of light filters.

* * * * *